Figure 1:
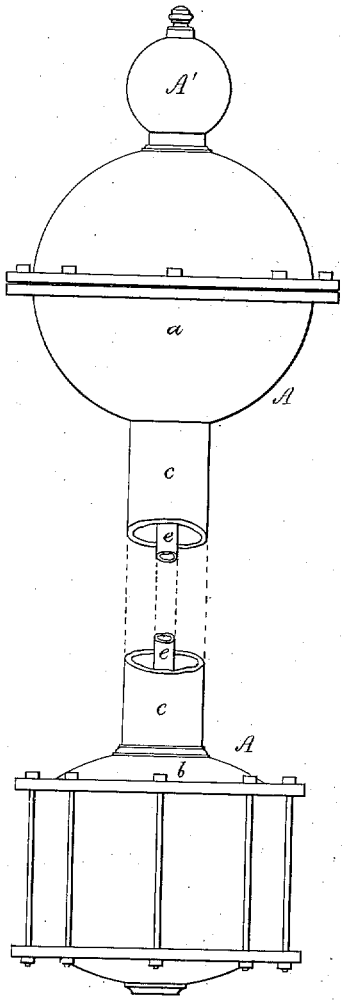

4 Sheets—Sheet 1.

E. S. RITCHIE.

MARINERS' COMPASS.

No. 6,827.

Reissued Dec. 28, 1875.

*Witnesses.*
S. W. Piper
L. W. Müller

*Edward Samuel Ritchie.*
*by his attorney.*
R. H. Eddy.

4 Sheets—Sheet 2.

E. S. RITCHIE.

MARINERS' COMPASS.

No. 6,827.

Reissued Dec. 28, 1875.

Witnesses.

S. W. Piper

L. W. Miller

Edward Samuel Ritchie.

by his attorney.

R. H. Eddy.

4 Sheets—Sheet 3.

E. S. RITCHIE.

MARINERS' COMPASS.

No. 6,827.

Reissued Dec. 28, 1875.

Witnesses.

S. N. Piper

L. M. Miller

Edward Samuel Ritchie by his attorney.

R. H. Eddy.

4 Sheets—Sheet 4.

E. S. RITCHIE.

MARINERS' COMPASS.

No. 6,827.

Reissued Dec. 28, 1875.

Witnesses.

S. N. Piper.

L. R. Müller.

Edward Samuel Ritchie.

by his attorney.

R. H. Ridley

UNITED STATES PATENT OFFICE.

EDWARD SAMUEL RITCHIE, OF BROOKLINE, MASSACHUSETTS.

IMPROVEMENT IN MARINERS' COMPASSES.

Specification forming part of Letters Patent No. 38,125, dated April 7, 1863; reissue No. 6,607, dated August 24, 1875; reissue No. 6,827, dated December 28, 1875; application filed October 5, 1875.

*To all whom it may concern:*

Be it known that I, EDWARD SAMUEL RITCHIE, of Brookline, in the county of Norfolk and State of Massachusetts, have made a new and useful invention, having reference to the Mariner's Compass; and do hereby declare the same to be fully described in the following specification and represented in the accompanying drawings, making part thereof.

One purpose of the invention is not only to dispose of a mariner's compass out of, or more or less beyond, the attractive influence of iron on or about the deck or other part of a ship or navigable vessel, but to enable the movements or operations of the compass-card, or the magnet or magnets of the compass, to be easily read or indicated, either at or near or below the deck, or at any convenient distance below the compass.

Another object of my invention is to enable the card of a mariner's liquid compass, or the float which supports the card, to more readily settle in a horizontal plane than would be the case were it an entire disk, or without any opening or openings through it for the liquid of the bowl to readily pass through.

My said invention is applicable to liquid compasses, and particularly to such as are provided with an air-vessel combined with the magnet, or the same and its card, in manner so as not only to encompass the magnet and insulate it from the surrounding liquid, but also to buoy up the magnet or magnet and card, in order to remove more or less of the weight thereof from the supporting pivot or bearing.

The nature of my said invention consists in the combination of an auxiliary air vessel or indicator and a connecting-rod with the magnet or magnets, or the same and its or their buoyant air-vessel, the whole being arranged within a case or vessel to contain water or other proper fluid, and so as to operate substantially as hereinafter specified.

And the nature of my invention further consists in the combination of either or both of the buoyant air-vessels with their shaft by means of gimbals.

And the nature of my invention further consists in the combination of an auxiliary buoyant chamber with the said connecting-rod or connector, the magnet, (or the same and its buoyant case,) and the auxiliary case or indicator, as arranged within a vessel or case containing a liquid, and so as to operate therein substantially as hereinafter specified.

And the nature of my invention further consists in, or has reference to, a peculiar arrangement of the cardinal divisions or indications with respect to the float or indicator, when made substantially as specified.

And my invention further consists in the combination of a hollow globe, open at top and bottom, and its supporting-gimbals, with the water case or vessel and the magnet buoyant air-vessel therein.

And my invention further consists in an improved or elongated magnet air-vessel and the magnet or magnets arranged lengthwise with respect to the same.

And my invention further consists in the combination of two or more buoyant radial floats or arms with the elongated magnet-vessel, the said arms or floats being for the purpose of giving stability in lateral directions to the magnet-float while submerged.

And my invention further consists in the combination of a graduation-ring with the radial-armed float, its connecting-rod, and the magnet-float, when arranged and combined within a water-vessel in manner and so as to operate substantially as described.

And my invention further consists in a mariner's liquid-compass card or indicator, perforated or open for the passage of the liquid of the bowl through such card, in order to facilitate the settling of the card in the liquid.

Figure 2:
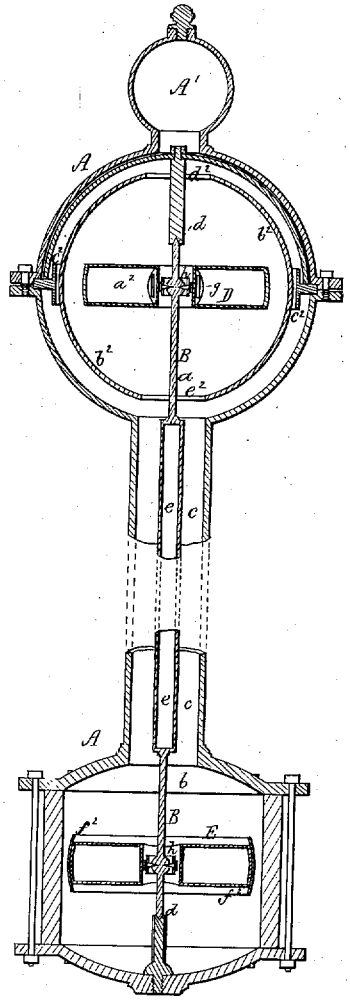
Figure 3:
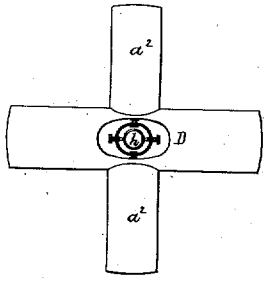
Figure 6:
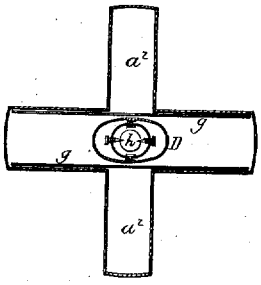
Figure 4:
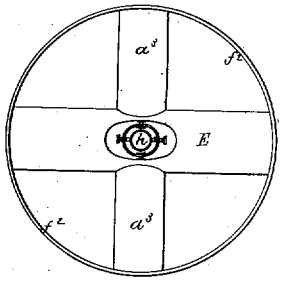
Figure 7:
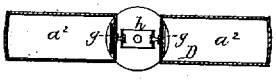
Figure 8:
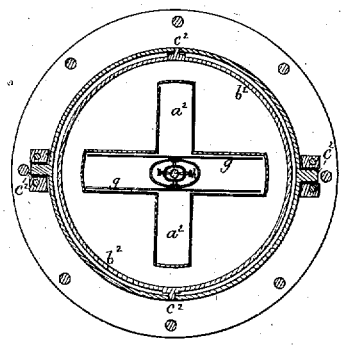

Of the drawings above mentioned, Figure 1, Sheet 1, denotes my invention or apparatus in side elevation, while Fig. 2 represents a vertical, central, and longitudinal section of it. Fig. 3, Sheet 2, is a top view of the magnet buoyant vessel, the vertical connecting shaft or rod, and a set of gimbals connecting the two. Fig. 4 is a top view, and Fig. 5 a side elevation, of the auxiliary float or indicator. Fig. 6 is a horizontal section of the magnet float or buoy. Fig. 7 is a vertical section of the needle-float. Fig. 8 is a horizontal section of the needle-float, its surrounding hollow globe, the gimbals, and the outer vessel thereof.

The drawings of the auxiliary sheets, or those marked Sheets 3 and 4, represent another mode of constructing my invention, or certain parts thereof, particularly the magnet air-vessel and the air-vessel on which the compass graduations are placed. The figures of the said Sheets 3 and 4 correspond to the first six figures of Sheets 1 and 2—that is, Fig. 1, Sheet 3, is a side elevation, and Fig. 2 a vertical section, of the apparatus. Fig. 3, Sheet 4, is a top view of the magnet buoyant air-vessel, the vertical connecting shaft or rod, and the gimbals connecting the two. Fig. 4, Sheet 4, is a top view, and Fig. 5, Sheet 4, a side elevation, of its auxiliary float or indicator. Fig. 6, Sheet 4, is a horizontal section of the magnet float or buoy.

The external vessel or case A, as shown in the drawings, may be supposed to be composed of two hollow and closed vessels, *a b*, and a tube, *c*, connecting the bottom of one—viz., *a*—with the top of the other—viz., *b*—of them, and opening into both of them, in order that water or a fluid, when passed into the upper vessel *a*, may pass freely through the tube *c*, and from thence into the vessel *b*. The said vessel *b* I usually construct cylindrical in form, and with its sides of a transparent material, such as glass, for instance, in order that the contents of such vessel *b* may be seen by looking through its sides. These two vessels *a b* and tube *c* are to contain water or other suitable liquid, which should fill them, as well as their connecting-pipe.

In Fig. 1, Sheet 1, I have exhibited a vessel or hollow globe, A′, as fixed on the top of the vessel *a*, and opening into it. The purpose of the additional vessel A′ is to allow either of the expansion or contraction of the liquid of the case A, such as arises from ordinary changes of atmospheric temperature.

A rod or shaft, B, extends axially within the case A, and is pivoted or supported by suitable bearings at its two extremities, the same being shown at *d d* in Fig. 2. This shaft may be tubular, or be composed in part of a tube, *e*, closed at its two ends, and constituting an air chamber or vessel of sufficient capacity to buoy the shaft in the liquid of the vessel A, in such manner as to cause it to bear with little or no pressure on its lower pivot or bearing.

By constructing the shaft tubular and buoyant, as specified, it is not liable to be bent or sagged when the apparatus is in an inclined position, or during the motions of a ship, while the said apparatus may be in use on board thereof.

Within the vessel *a*, and concentric with the shaft B, there is a float-buoy or buoyant vessel, D, within which there should be arranged one or more bar-magnets, *g*. (See Fig. 6.) In Figs. 6, 7, and 8, Sheet 2, the said vessel D is represented as having the form of a cylinder, of a length considerably greater than its diameter, and also as provided with two lateral radial arms or buoyant chambers or vessels, $a^2$ $a^2$, the purpose of such arms being to give to the vessel D stability in lateral directions in the liquid contained in the part *a* of the case A.

The object of making the air-vessel D of the elongated form, whether such be cylindrical or polygonal in transverse section, is to reduce it to such a shape as will enable the liquid surrounding it to exercise against it the least disturbing action calculated to move it, with its magnet, out of the true meridional direction. The elongated form I have found by practical experience to be much preferable to the annular or cylindrical ring-vessel, as shown in Figs. 2, 3, and 6 of Sheets 3 and 4.

In Figs. 2 and 8 of Sheets 1 and 2 I have represented a hollow globe, $b^2$, as arranged concentrically within the vessel *a*, and as connected to it by gimbals, as shown at $c^2$. This interior globe should have a large opening both at top and bottom, as shown at $d^2$ $e^2$ in Fig. 2. These openings permit the passage of the shaft B through the said vessel $b^2$, and also permit the motions of the globe in its various directions without contact with the shaft. The object of this globe $b^2$, and its connection with the vessel *a* by gimbals, is to prevent the rotary motion of the liquid inclosed by it during the oscillations of the case A. During such oscillations there will be little or no movement of the equator of the globe out of its true horizontal position, and consequently the friction of the globe on the contained liquid will have little tendency to produce rotary motion of the said liquid and the magnet-vessel within it.

Figure 5:
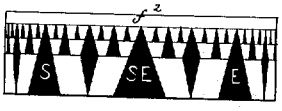
Figure 1:
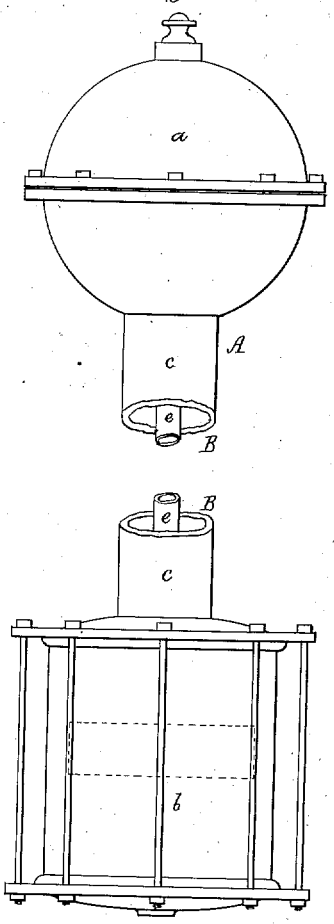
Figure 2:
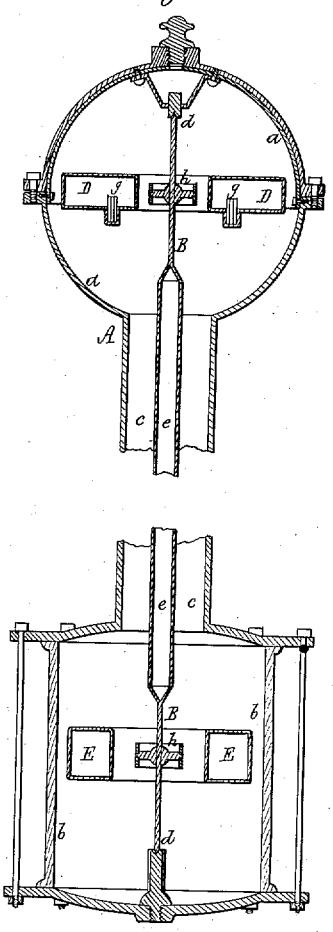
Figure 3:
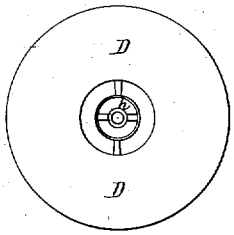
Figure 6:
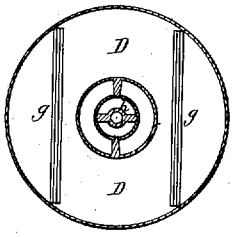
Figure 5:
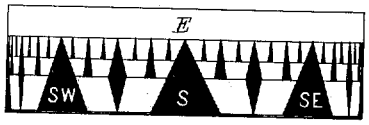
Figure 4:
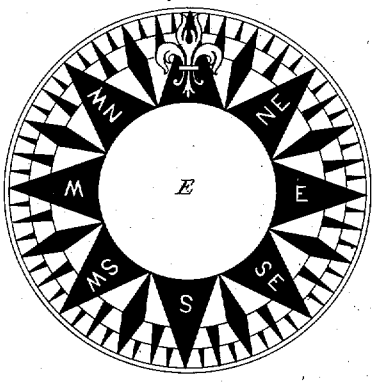

There is also another such float or buoyant vessel, E, which is arranged within the vessel *b*, and in a similar manner with respect to the shaft B. Each of the said floats D E is to be connected with the shaft B by a set of gimbals, *h*. There is to be no magnet within the vessel E, whose buoyant power should be sufficient, or about so, to counterbalance the tendency of the said vessel and its set of gimbals to sink in the fluid of the vessel *b*. The vessel E is furnished with radial lateral arms, $a^3$ $a^3$, and it and such arms are surrounded by and fixed to a thin annulus or ring, $f^2$, on whose outer periphery the cardinal divisions are to be formed, such being shown in Fig. 5, Sheet 2. Furthermore, when the vessel E is formed as shown in Sheets 3 and 4, I make on either the under or upper surface of it, or down along its external curved surface or periphery, cardinal divisional marks, indicative of the points of the compass, the same being as shown in Figs. 4 and 5 of Sheet 4.

I do not confine my invention to the particular form of the indicator E, as it may be otherwise constructed, and yet serve its main purpose or object, viz., that of indicating the movements and positions of the magnet or magnets; nor is it essential to my invention that either of the parts D E should be made as a hollow vessel, as there are other ways in which it may be constructed and yet perform its function.

The tube *c* may be of any length which, according to circumstances, may be necessary to carry the magnets, for all practical purposes, a sufficient distance above any metallic body which may be at or near the deck or any other part of a navigable vessel.

When in use my apparatus is intended to be affixed to the mast, or some other suitable part of a ship or navigable vessel, and so that, while the part *b* may be sufficiently near the deck to allow of the divisions on the part E being readily seen by a person when on deck, the part *a* may be at such an altitude above the deck as will practically remove the magnets out of the influence of the attractive power of any iron on or near the deck.

It will be observed that during the rolling, as well as during the pitching, motion of the ship the two floats or air-vessels D E, by the operation of gravity, will preserve their horizontal positions, and this notwithstanding their connector or shaft B may be inclined more or less to the horizon in the meantime.

The gimbals and the shaft constitute such a connection of the parts D E that any rotary motion of the upper one, occasioned by its magnet or magnets, will be attended by a corresponding movement of the lower one, or that marked E.

In constructing the apparatus I prefer to make the magnet buoyant vessel the tubular part of the shaft or axis, and also the lower buoyant vessel or indicator, in such manner that each, as nearly as practicable, shall be of the same weight as the volume of liquid displaced thereby.

From the above, and from the drawings, it will be seen that the compass-card is an annulus, or has one or more holes or passages through it, through which the liquid of the bowl or surrounding vessel can freely flow, such enabling the card to quicker settle to a horizontal position, and better maintain such, than would be the case were it without any passage or passages through it vertically.

Having thus described my invention, what I claim is as follows:

1. The combination of the auxiliary air-vessel or indicator E and the connecting-rod B with the magnet or magnets *g*, or the same and its or their air-tight or buoyant case D, the whole being arranged within the vessel or case A, to contain water or other proper fluid, and so as to operate together substantially as above specified.

2. The combination of either or both the buoyant air-vessels D E with their shaft or rod B by means of gimbals *h*, the shaft or rod B being arranged and supported within a case, A, substantially in manner and so as to operate as described.

3. The combination of an auxiliary buoyant vessel, *e*, with the rod or connector B, the magnet, or the same and its buoyant case D, and the auxiliary case or vessel A, containing water or other suitable fluid, so as to operate therein substantially as hereinbefore specified.

4. The compass-card, having the cardinal divisions marked upon it, affixed to the external periphery of the float E, substantially as specified.

5. The combination of a hollow globe, $b^2$, open at top and bottom, and its supporting-gimbals, with the water case or vessel *a*, and the magnet buoyant air-vessel therein.

6. The magnet air-vessel, as made of an elongated form, and as having its magnet or magnets arranged lengthwise within it, substantially as represented in Figs. 6, 7, and 8 of Sheet 2, and as hereinbefore specified.

7. The combination of two or more buoyant radial floats or arms, $a^2$ $a^2$, with the elongated magnet-vessel, the said arms being for the purpose hereinbefore stated.

8. The combination of a graduating-ring, $f^2$, with the radial-armed float E, its connecting-rod B, and the magnet-float D, when arranged and combined within a water-vessel, A, in manner and so as to operate substantially as described.

9. In or for a mariner's liquid compass, the card or indicator, perforated for the passage of the liquid of the bowl through it, in order to facilitate the settling of the card, as specified.

EDW. S. RITCHIE.

Witnesses:
R. H. EDDY,
J. R. SNOW.